April 21, 1953   B. H. CARROLL   2,635,961
SUPERSENSITIZATION OF PHOTOGRAPHIC EMULSIONS
WITH COMPLEX MEROCYANINE DYES
Filed March 1, 1952

Fig. 1

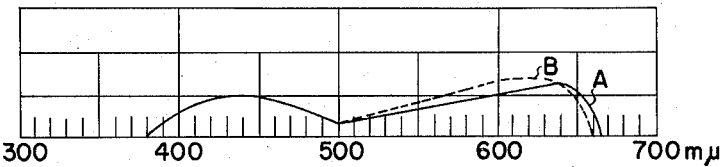

A = 8,10- Di(p-CHLOROPHENOXY)-3,3'-DIMETHYLTHIACARBOCYANINE
    p-TOLUENESULFONATE
B = 8,10- Di(p-CHLOROPHENOXY)-3,3'-DIMETHYLTHIACARBOCYANINE
    p-TOLUENESULFONATE PLUS 5-[(1-ETHYL-2(1)-β-
    NAPTHOTHIAZOLYLIDENE)-α-ETHYLETHYLIDENE]-3-β-
    METHOXYETHYL-2-(3-β-METHOXYETHYL-4-OXO-2-THIONO-
    5-THIAZOLIDYLIDENE)-4-THIAZOLIDONE

Fig. 2

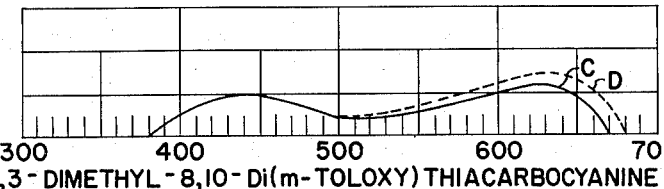

C = 3,3'-DIMETHYL-8,10-Di(m-TOLOXY)THIACARBOCYANINE BROMIDE
D = 3,3'-DIMETHYL-8,10-Di(m-TOLOXY)THIACARBOCYANINE BROMIDE
    PLUS 5-[(3-β-HYDROXYETHYL-2(3)-α-NAPTHOTHIAZOLYLIDENE)
    ETHYLIDENE]-3-β-METHOXYETHYL-2-(β-METHOXYETHYL-
    4-OXO-2-THIONO-5-THIAZOLIDYLIDENE)-4-THIAZOLIDONE

Fig. 3

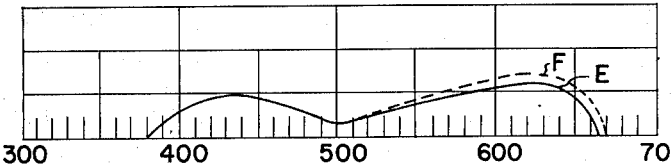

E = 3,3'-DIMETHYL-8,10-Di(m-TOLOXY)THIACARBOCYANINE BROMIDE.
F = 3,3'-DIMETHYL-8,10-Di(m-TOLOXY)THIACARBOCYANINE BROMIDE
    PLUS 2-(3-CARBETHOXYMETHYL-4-OXO-2-THIONO-5-
    THIAZOLIDYLIDENE)-3-ETHYL-5-[(1-ETHYL-2(1)-β-
    NAPTHOTHIAZOLIDENE) ISOPROPYLIDENE]-4-THIAZOLIDONE

BURT H. CARROLL
INVENTOR.

BY

ATT'Y. & AG"T.

Patented Apr. 21, 1953

2,635,961

UNITED STATES PATENT OFFICE 2,635,961

SUPERSENSITIZATION OF PHOTOGRAPHIC EMULSIONS WITH COMPLEX MEROCYANINE DYES

Burt H. Carroll, Rochester, N. Y., assignor to Eastman Kodak Company, Rochester, N. Y., a corporation of New Jersey Application March 1, 1952, Serial No. 274,445

15 Claims. (Cl. 95—7)

This invention relates to photographic emulsions comprising certain diaryloxythiacarbocyanine dyes, and as supersensitizers therefor, certain complex merocyanine dyes.

It is known in the art of making photographic emulsions that certain dyes of the cyanine class alter the sensitivity of photographic emulsions of the gelatino-silver kind, when the dyes are incorporated in the emulsions. It is also known that the sensitization produced by a given dye varies somewhat with the type of emulsion in which the dye is incorporated. Furthermore, the sensitization of a given emulsion by a given dye may be altered by varying conditions in the emulsion. For example, the sensitization may be increased by increasing the silver ion concentration or decreasing the hydrogen ion concentration (i. e. increasing the alkalinity) or both. Thus, sensitization can be increased by bathing plates, coated with a spectrally sensitized emulsion, in water or in aqueous solutions of ammonia. Such a process of altering the sensitivity of a sensitized emulsion by increasing the silver ion concentration and/or by decreasing the hydrogen ion concentration is commonly called "hypersensitization." Hypersensitized emulsions have generally poor keeping qualities.

I have now found a new means of altering the sensitivity in emulsions containing certain diaryloxythiacarbocyanine dyes of a particular type. Since the conditions in the emulsion, i. e. the hydrogen ion and/or the silver ion concentration undergo little or no change in my new method, I shall designate my new method as a kind of supersensitization.

It is, therefore, an object of my invention to provide photographic emulsions comprising certain diaryloxythiacarbocyanine dyes and, as supersensitizers therefor, certain complex merocyanine dyes. Another object is to provide a process for preparing these supersensitized emulsions. Other objects will become apparent from a consideration of the following description and examples.

The complex merocyanine dyes useful in practicing my invention have been previously proposed as sensitizers for photographic emulsions in Brooker U. S. Patent 2,544,629, issued November 23, 1948, beginning at line 62, col. 17. The parent merocyanine dyes from which the complex dyes are derived have no corresponding supersensitizing effects. Nor do the complex cyanines (also described in 2,454,629) derived from the same parent merocyanine dyes exhibit the supersensitizing effects shown in the instant invention. The unique character of, and unexpected behavior exhibited by my new supersensitizing combinations are thus evident.

The diaryloxythiacarbocyanine dyes useful in practicing my invention comprise the 3,3'-dimethyl - 8,10 - diaryloxythiacarbocyanine dyes of Brooker and White U. S. Patent 2,478,366, issued August 9, 1949. These dyes share the characteristic of a sharp maximum lying at a wavelength considerably longer than that of the dye in the molecular state. Further, these dyes have unusually strong and sharp maxima of absorption and sensitivity, but when used alone, their usefulness is limited by low speeds, which may be traced to low efficiency of energy transfer from the dye to the silver halide grain, and to desensitization. (Spence and Carroll, "Jour. Phys. & Coll. Chem., vol. 52 (1948), p. 1090). The 3,3'-diethyl-8,10-diaryloxythiacarbocyanine dyes, 3,3' - diethyl - 8,10 - diaryloxyselenacarbocyanine dyes, and 3,3' - diethyl - 8,10 - diaryloxyoxacarbocyanine dyes have not given consistent results which would justify their use for the purposes of this invention.

The 3,3' - dimethyl - 8,10 - diaryloxythiacarbocyanine dyes useful in practicing my invention can advantageously be represented by the following general formula:

I.

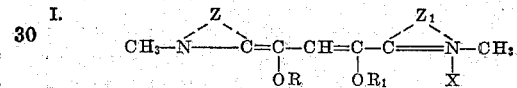

wherein R and $R_1$ each represents an aryl group, such as phenyl, o-, m-, and p-tolyl, o-, m-, and p-methoxyphenyl, o-, m-, and p-chlorophenyl, β-naphthyl, etc. (e. g. especially a mononuclear aromatic nucleus of the benzene series), Z and $Z_1$ each represents the nonmetallic atoms necessary to complete a heterocyclic nucleus of the benzothiazole series and X represents an anion, such as bromide, iodide, chloride, perchlorate, thiocyanate, methylsulfate, ethylsulfate, benzenesulfonate, p-toluenesulfonate, etc. The dyes represented by Formula I can be prepared according to the method described in U. S. Patent 2,478,366 mentioned above.

The complex merocyanine useful in practicing my invention can be represented by the following general formula:

II.

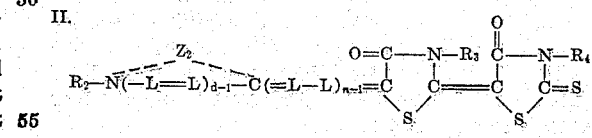

wherein $R_2$, $R_3$, and $R_4$ each represents an alkyl group, such as methyl, ethyl, n-propyl, n-butyl, n-heptyl, β-hydroxyethyl, β-carbethoxymethyl, β-methoxyethyl, β-ethoxyethyl, β-hydroxy-β-ethoxy-β-ethoxyethyl, etc., L represents a methine group (i. e. —CR'=, wherein R' is a hydrogen atom, an alkyl group (methyl, ethyl, etc.) or an aryl group (phenyl, tolyl, etc.), etc.), $d$ and $n$ each represents a positive integer of from 1 to 2, and $Z_2$ represents the nonmetallic atoms necessary to complete a heterocyclic nucleus selected from those of the benzothiaole series, the α-naphthothiazole series, the β-naphthothiazole series, the benzoxazole series, and the quinoline series. The complex mercyanine dyes represented by Formula II above can be prepared according to the method described in U. S. Patent 2,454,629, mentioned above.

According to my invention, I incorporate one or more of the diaryloxycarbocyanine dyes selected from those represented by Formula I above with one or more of the complex merocyanine dyes selected from those represented by Formula II above in a photographic emulsion. My invention is particularly directed to the ordinarily employed gelatino-silver-halide emulsions. However, my supersensitizing combination can be employed in silver halide emulsions in which the carrier is other than gelatin, e. g., a resinous substance or cellulosic material which has no deteriorating effect on the light-sensitive materials.

The sensitizing dyes can be employed in various concentrations depending upon the effects desired. As is well known in the art, the sensitivity conferred upon an emulsion by a sensitizing dye does not increase proportionately to the concentration of the dye in the emulsion, but rather passes through a maximum as the concentration is increased. In practicing my invention, the individual sensitizing dyes are advantageously employed in a concentration somewhat less than their optimum concentration (i. e. the concentration at which the individual dyes give greatest sensitivity). If each of the dyes in the supersensitizing combination is employed in its optimum concentration, it is possible, in certain cases that the sensitization produced by the supersensitizing combination will have passed through a maximum.

The optimum concentration of an individual sensitizing dye can be determined in a manner well known to those skilled in the art by measuring the sensitivity of a series of test portions of the same emulsion, each portion containing a different concentration of the sensitizing dye. The optimum concentration of my supersensitizing combinations can, of course, be readily determined in the same manner, by measuring the sensitivity of a series of test portions of the same emulsion, each portion containing different concentrations of the individual dyes in the combination. In determining the optimum concentration for the supersensitizing combination, it is advantageous to employ, at first, concentrations of the individual dyes less than their optimum concentrations. The concentrations of the individual dyes can then be increased until the optimum concentration of the supersensitizing combination is determined.

Ordinarily the optimum or near optimum concentration of the diaryloxycarbocyanine dyes, selected from those represented by Formula I above which I employ in practicing my invention, is of the order of from 0.02 to 0.20 g. per mole of silver halide in the emulsion.

The complex merocyanine dyes selected from those represented by Formula II above are advantageously employed at concentrations on the order of 0.001 to 0.05 g. per mole of silver halide in the emulsion.

Generally speaking, the ratio of concentration of the complex merocyanine dye (Formula II) to diaryloxycarbocyanine dye (Formula I) can vary rather widely in my new combinations, e. g. from 1:100 to 1:2 (by weight) in many cases.

The methods of incorporating sensitizing dyes in emulsions are well known to those skilled in the art. In practicing my invention, the sensitizing dyes can be incorporated in the emulsions separately or together. It is convenient to add the dyes separately in the form of solutions in appropriate solvents. Methanol and ethanol, especially the former, have proven satisfactory as solvents for the dyes of Formula I which I employ, while acetone has proven satisfactory as a solvent (with small amounts of o-chlorophenol to improve solubility in some instances) for the complex merocyanine dyes of Formula II. The dyes are advantageously incorporated in the finished, washed emulsions and should be uniformly distributed throughout the emulsions. The following procedure is satisfactory: Stock solutions of the sensitizing dyes desired are prepared by dissolving the dyes in appropriate solvents as described above. Then, to one liter of a flowable gelatino-silver-halide emulsion, the desired amounts of the stock solution of one of the dyes is slowly added, while stirring the emulsion. Stirring is continued until the dye is thoroughly incorporated in the emulsion. Then the desired amount of the stock solution of the second dye is slowly added to the emulsion, while stirring. Stirring is continued until the second dye is thoroughly incorporated. The supersensitized emulsion can then be coated out on a suitable support, such as glass, cellulose derivative film, resin film, or paper, to a suitable thickness and allowed to dry. The details of such coating methods are well known to those skilled in the art.

The amounts of the individual sensitizing dyes actually incorporated in the emulsion will vary somewhat from dye to dye, according to the emulsion employed and according to the effect desired. The regulation and adoption of the most economical and useful proportions will be apparent to those skilled in the art upon making the ordinary observations and tests customarily employed in the art. Accordingly, the foregoing procedures and proportions are to be regarded only as illustrative. Clearly my invention is directed to any emulsion containing a combination of the aforesaid sensitizing dyes whereby a supersensitizing effect is obtained.

The following examples will serve to illustrate further the manner of practicing my invention. To different portions of the same batch of photographic gelatino-silver bromiodide emulsion were added (1) a diaryloxycarbocyanine dye selected from those of Formula I above and (2) a combination of the diaryloxycarbocyanine dye and a complex merocyanine dye selected from those represented by Formula II above. In some instances a third coating was prepared using the same emulsion formula and adding only one of the complex merocyanine dyes selected from those of Formula II. In general, the table will show that this third coating gave only a low speed or one too small to measure (designated * in the table). Different emulsions were used in some of the examples, although the emulsions of each individual example are obtained from the same batch. However, the coatings of Examples 1 to 5 were from the same batch of emulsion, the coatings of Examples 6 to 9 were from the same batch of emulsion, the coatings of Examples 10 to 18 were from the same batch of emulsion, and the coatings of Examples 19 and 20 were from the same batch of emulsion. Before coating, the emulsions containing the sensitizing dyes were digested for a short time in a tank maintained at 52° C., and the sensitized emulsion coated and processed. The different portions of emulsion were then coated on glass supports and exposed in the usual manner in a spectrograph and a sensitometer (type 1b) through a Wratten 25 filter, i. e. a filter which transmits substantially no light of wavelength shorter than 580 m$\mu$. Following are several examples of such emulsions together with the speed (red), gamma and fog obtained.

the sensitivity conferred on the emulsion by the complex merocyanine dye alone is shown, since the sensitivity conferred by the complex merocyanine in question is too weak to be significant in the comparisons shown.

In Fig. 1, curve A represents the sensitivity of an ordinary gelatino-silver-bromiodide emulsion sensitized with 8,10-di(p-chlorophenoxy)-3,3'-dimethyl-thiocarbocyanine p-toluenesulfonate, and curve B represents the sensitivity of the same emulsion containing 8,10-di(p-chlorophenoxy)-3,3'-dimethylthiacarbocyanine p-toluenesulfonate and 5-[(1-ethyl-2(1)-$\beta$-naphthothiazolylidene)-$\alpha$-ethylethylidene]-3-$\beta$-methoxyethyl-2-(3-$\beta$-methoxyethyl-4-oxo-2-thioro-5-thiazolidylidene)-4-thiazolidone. The sensitometric measurements for these emulsions are given in Example 5 of the above table.

In Fig. 2, curve C represents the sensitivity of an ordinary gelatino-silver-bromiodide emulsion sensitized with 3,3'-dimethyl-8,10-di(m-toloxy)-

| Example | Dye (g. per mole of silver halide in emulsion) | Red Light Exposure | | |
|---|---|---|---|---|
| | | Speed | Gamma | Fog |
| 1 | (a) 5-[(1-ethyl-2(1)-$\beta$-naphthothiazolylidene)-$\alpha$-ethylethylidene]-3-$\beta$-methoxyethyl-2-(3-$\beta$-methoxyethyl-4-oxo-2-thiono-5-thiazolidylidene)-4-thiazolidone (0.001) | 2.55 | 3.0 | .04 |
| | (b) dye (a) (0.020) | 22.5 | 4.1 | .05 |
| | (c) dye (a) (0.040) | 26.5 | 4.5 | .05 |
| | (d) dye (a) (0.080) | 16.0 | 3.1 | .06 |
| 2 | (e) 8,10-di(p-methoxyphenoxy)-3,3'-dimethylthiacarbocyanine bromide (0.080) | 21.5 | 2.22 | .05 |
| | (f) dye (a) (0.001) with dye (e) (.080) | 30.0 | 2.65 | .04 |
| | (g) dye (a) (0.040) with dye (e) (.080) | 40.0 | 3.29 | .06 |
| 3 | (h) 3,3'-dimethyl-8,10-diphenoxythiacarbocyanine bromide (0.080) | 22.5 | 2.4 | .05 |
| | (i) dye (a) (0.001) with dye (h) (0.080) | 25.5 | 2.6 | .05 |
| 4 | (j) dye (a) (0.040) with dye (h) (0.080) | 34.0 | 3.74 | .07 |
| 5 | (k) 8,10-di(p-chlorophenoxy)-3,3'-dimethylthiacarbocyanine p-toluenesulfonate (0.080) | 22.5 | 2.70 | .05 |
| | (l) dye (k) (0.030) with dye (a) (0.001) | 34.0 | 4.2 | .05 |
| 6 | (m) 3,3'-dimethyl-8,10-di(m-toloxy)thiacarbocyanine bromide (0.080) | 27.0 | 3.14 | .08 |
| | (n) dye (m) (0.080) with dye (a) (0.001) | 36.0 | 3.20 | .09 |
| 7 | (o) 5-[3-$\beta$-Hydroxyethyl-2(3)-$\alpha$-naphthothiazolylidene)ethylidene]-2-$\beta$-methoxyethyl-2-(3-$\beta$-methoxyethyl-4-oxo-2-thiono-5-thiazolidylidene)-4-thiazolidone (0.001) | 2.8 | 1.2 | .05 |
| | (p) dye (o) (0.001) with dye (m) (0.080) | 38.0 | 3.10 | .09 |
| 8 | (q) 3-ethyl-5-(1-ethyl-2(1)-quinolylidene-2-(3-ethyl-4-oxo-2-thiono-5-thiazolidylidene)-4-thiazolidone (0.001) | * | * | * |
| | (r) dye (m) (0.080) with dye (q) (0.001) | 31.5 | 2.98 | .09 |
| 9 | (s) 3-ethyl-5-[(3-ethyl-2(3)-benzoxazolylidene)ethylidene]-2-(3-ethyl-4-oxo-2-thiono-5-thiazolidylidene)-4-thiazolidone (0.001) | 2.2 | 3.2 | .04 |
| | (t) dye (s) (0.001) with dye (m) (0.080) | 34.0 | 3.22 | .05 |
| 10 | (u) 3,3'-dimethyl-8,10-di(m-toloxy)thiacarbocyanine bromide (0.080) | 16.2 | 2.79 | .08 |
| | (v) 2-(3-carbethoxymethyl-4-oxo-2-thiono-5-thiazolidylidene)-3-ethyl-5-[(1-ethyl-2(1)-$\beta$-naphthothiazolylidene)-$\alpha$-ethylethylidene]-4-thiazolidone (0.001) | 2.7 | 2.65 | .04 |
| | (w) dye (u) (0.080) with dye (v) (0.001) | 25.0 | 2.30 | .08 |
| 11 | (x) 2-(3-carbethoxymethyl-4-oxo-2-thiono-5-thiazolidylidene)-3-ethyl-5-[(1-ethyl-2(1)-$\beta$-naphthothiazolylidene)isopropylidene]-4-thiazolidone (0.001) | 2.2 | 0.88 | .05 |
| | (y) dye (x) (0.001) with dye (u) (0.080) | 29.0 | 2.60 | .08 |
| 12 | (z) 5-[(1-ethyl-2(1)-$\beta$-naphthothiazolylidene)-$\alpha$-phenylethylidene]-3-$\beta$-methoxyethyl-2(3-$\beta$-methoxyethyl-4-oxo-2-thiono-5-thiazolidylidene)-4-thiazolidone (0.001) | 3.7 | 3.29 | .04 |
| | (a') dye (z) (0.001) with dye (u) (0.080) | 34.0 | 2.41 | .08 |
| 13 | (b') 5-[(1-ethyl-2(1)-$\beta$-naphthothiazolylidene)ethylidene]-3-$\beta$-methoxyethyl-2(3-$\beta$-methoxyethyl-4-oxo-2-thiono-5-thiazolidylidene)-4-thiazolidone (0.001) | 3.2 | 2.10 | .04 |
| | (c') dye (b') (0.001) with dye (u) (0.080) | 24.5 | 2.90 | .08 |
| 14 | (d') 2-(3-carbethoxymethyl-4-oxo-2-thiono-5-thiazolidylidene)-3-ethyl-5-[(1-ethyl-2(1)-$\beta$-naphthothiazolylidene)ethylidene]-4-thiazolidone (0.001) | 2.55 | 2.12 | .04 |
| | (e') dye (d') (0.001) with dye (u) (0.080) | 26.5 | 2.71 | .04 |
| 15 | (f') 2-(3-carbethoxymethyl-4-oxo-2-thiono-5-thiazolidylidene)-3-ethyl-5[(3-ethyl-2(3)-benzothiazolylidene)ethylidene]-4-thiazolidone (0.001) | 2.95 | 2.61 | .04 |
| | (g') dye (f') (0.001) with dye (u) (0.080) | 23.5 | 2.98 | .08 |
| 16 | (h') 3-ethyl-5-[(3-ethyl-2(3)-benzothiazolylidene)isopropylidene]-2-(3-n-heptyl-4-oxo-2-thiazolidylidene)-4-thiazolidone (0.001) | * | * | * |
| | (i') dye (h') (0.001) with dye (u) (0.080) | 23.0 | 2.47 | .05 |
| 17 | (j') 3-ethyl-5-[(3-ethyl-2(3)-benzothiazolylidene)-$\alpha$-ethylethylidene]-2-(3-$\beta$-hydroxy-$\beta$-ethoxy-$\beta$-ethoxyethyl-4-oxo-2-thiono-5-thiazolidylidene)-4-thiazolidone (0.001) | 2.55 | 1.41 | .04 |
| | (k') dye (j') (0.001) with dye (u) (0.080) | 31.5 | 2.91 | .09 |
| 18 | (l') 2-(3-carbethoxymethyl-4-oxo-2-thiono-5-thiazolidylidene)-3-ethyl-5-[(3-ethyl-4-phenyl-2(3)-benzothiazolylidene)ethylidene]-4-thiazolidone (0.001) | 3.15 | 3.01 | .04 |
| | (m') dye (l') (0.001) with dye (u) (0.080) | 25.5 | 2.95 | .08 |
| 19 | (n') 3,3'-dimethyl-8,10-di(m-toloxy)thiacarbocyanine bromide (0.080) | 27.0 | 3.14 | .08 |
| | (o') dye (n') (0.080) with dye (a) (0.001) | 36.0 | 3.20 | .09 |
| 20 | (p') 5-(3-ethyl-2(3)-benzothiazolylidene)-3-ethyl-2-(3-ethyl-4-oxo-2-thiono-5-thiazolidylidene)-4-thiazolidone (0.001) | * | * | * |
| | (q') dye (p') (0.001) with dye (n') (0.080) | 30.0 | 2.36 | .06 |

The accompanying drawing illustrates the supersensitizing effect obtained with three of my new combinations in silver bromiodide emulsions. Each figure of the drawing is a diagrammatic reproduction of two spectrograms. In each figure the sensitivity of the emulsion containing the diaryloxycarbocyanine dye is represented by the lower curve. The upper curve represents the sensitivity conferred on the emulsion by the combination of the diaryloxycarbocyanine dye and the complex merocyanine dye. No curve showing thiacarbocyanine bromide, and curve D represents the sensitivity of the same emulsion containing 3,3'-dimethyl-8,10-di(m-toloxy)thiacarbocyanine bromide and 5-[(3-$\beta$-hydroxyethyl-2(3)-$\alpha$-naphthothiazolylidene)ethylidene]-3-$\beta$-methoxyethyl-2-(3-$\beta$-methoxyethyl-4-oxo-2-thioro-5-thiazolidylidene)-4-thiazolidone. The sensitometric measurements for these emulsions are given in Example 7 of the above table.

In Fig. 3, curve E represents the sensitivity of an ordinary gelatino-silver-bromiodide emulsion sensitized with 3,3'-dimethyl-8,10-di(m-toloxy)-thiacarbocyanine bromide, and curve F represents the sensitivity of the same emulsion containing 3,3'-dimethyl-8,10-di(m-toloxy)thiacarbocyanine bromide and 2-(3-carbethoxy-methyl-4-oxo-2-thioro-5-thiazolidylidene)-3-ethyl-5-[(1-ethyl-2(1)-β-naphthothiazolylidene)isopropylidene]-4-thiazolidone. The sensitometric measurements for these emulsions are given in Example 11 of the above table.

My invention is primarily directed to the ordinarily employed gelatino-silver-halide developing-out emulsions, e. g. gelatino-silver-chloride, -chlorobromide, -chloriodide, -chlorobromiodide, -bromide and -bromiodide developing-out emulsions. While the results in the above table were obtained using gelatino-silver-bromiodide emulsions, excellent results have also been obtained using gelatino-silver-chlorobromide emulsions. Emulsions which form the latent image mostly inside the silver halide grains, such as the emulsion set forth in U. S. Patent 2,456,956, dated December 21, 1948, can also be employed in practicing my invention.

The emulsions prepared in accordance with my invention can be coated in the usual manner on any suitable support, e. g. glass, cellulose nitrate film, cellulose acetate film, polyvinyl acetal resin film, paper or metal.

The following examples will serve to illustrate the manner whereby the complex merocyanine dyes used in my invention can be prepared.

*Example 21.—5 - [(1-ethyl-2(1)-β-naphthothiazolylidene) - α -ethylethylidene]-3-β-methoxyethyl - 2-(3-β-methoxyethyl-4-oxo-2-thiono-5-thiazolidylidene)-4-thiazolidone*

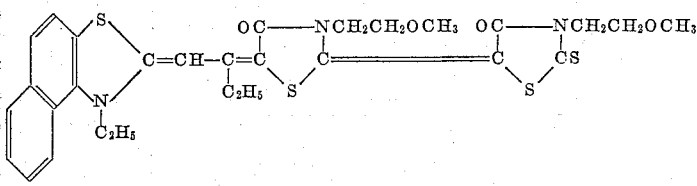

A mixture of 2.28 g. (1 mol.) of 5-[(1-ethyl-2(1) - β - naphthothiazolylidene) - α-ethylethylidene]-3-β-methoxyethylrhodanine and 0.93 g. (1 mol.) of methyl p-toluenesulfonate were fused together over a free flame and then heating was continued for 4 hours at the temperature of the steam bath. The crude addition product, thus formed, 0.96 g. (1 mol.) of 3-β-methoxyethylrhodanine and 0.53 g. (1 mol. plus 5% excess) of triethylamine in 25 ml. of dry pyridine were heated together at the refluxing temperature for 5 minutes. After cooling, the dye was collected on a filter and washed with methyl alcohol. The yield of dye was 86% crude and 72% after two recrystallizations from pyridine. The green crystals had melting point 272–273° C. with decomposition.

The 5 - [(1 - ethyl - 2(1) -β-naphthothiazolylidene)-α-ethylethylidene]- 3 - β - methoxyethylrhodanine used above was prepared as follows:

A mixture of 4.50 g. (1 mol.) of 1-ethyl-2-thiopropionylmethylene - β - naphthothiazoline and 2.79 g. (1 mol.) of methyl-p-toluenesulfonate was fused over a free flame and then heating was continued at the temperature of the steam bath for 4 hours. This crude addition product, 2.87 g. (1 mol.) of 3-β-methoxyethylrhodanine and 1.60 g. (1 mol. plus 5% excess) of triethylamine in 50 ml. of absolute ethyl alcohol were heated together at the refluxing temperature for 30 minutes. After cooling, the dye was collected on the filter and washed with methyl alcohol. The crude dye was dissolved in hot pyridine and precipitated from the pyridine filtrate by the addition of methyl alcohol. After another such purification the yield of dye was 78%. The purplish crystals had melting point 184–185° C. with decomposition.

The 3-β-methoxyethylrhodanine used above was prepared as follows:

A mixture of 50 g. (1 mol.) of 85% potassium hydroxide dissolved in 300 ml. of water and 77 g. (1 mol.) of a 72% aqueous solution of β-methoxyethylamine was stirred mechanically as 57 g. (1 mol.) of carbon disulfide was added, over a period of 30 minutes. The reaction mixture was heated, with stirring, on the steam bath for about 2 hours. After dissolving 72 g. (1 mol.) of chloroacetic acid in 100 ml. of water the solution was neutralized with sodium carbonate and the resulting solution was added to the reaction mixture. The mixture was stirred for about one hour, stood overnight at room temperature and then made acid to Congo red paper with dilute sulfuric acid. About two hours later the oily layer was collected at the separatory funnel. The aqueous layer was extracted with benzene. The combined benzene extract and the oily layer was washed with water, and then the benzene was removed by fractionation. The residue was distilled. The 3-β-methoxyethylrhodanine distilled at 155–160° C. at 20 mm. The yield of light orange oil was 83%.

*Example 22.—5-[(1-ethyl-2(1)-β-napthothiazolylidene)ethylidene] - 3 - β - methoxyethyl - 2 - (3 - β - methoxyethyl - 4 - oxo - 2 - thiono - 5 - thiazolidylidene)-4-thiazolidone*

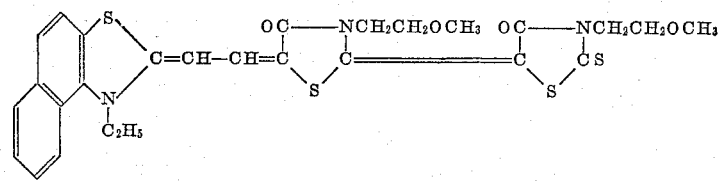

A mixture of 2.14 g. (1 mol.) of 5-[(1-ethyl-2(1) - β - naphthothiazolylidene)ethylidene] - 3 - β-methoxyethylrhodanine and 3.8 g. (1 mol. plus 300% excess) of methyl-p-toluenesulfonate was heated for 4 minutes at 160° C. The crude addition product, thus formed, and 1.2 g. (1 mol.) of 3-β-methoxyethylrhodanine in 25 ml. of dry pyridine were heated together to the boiling point, then 0.5 g. (1 mol.) of triethylamine was added and the reaction mixture was heated at the refluxing temperature for 30 minutes. After chilling, the dye was collected on a filter and washed with methyl alcohol. The yield of dye was 75% crude and 38% after two recrystallizations from pyridine. The green crystals had melting point 292–295° C. with decomposition.

The 5 - [(1 - ethyl - 2(1) - β - naphthothiazolylidene)ethylidene] - 3 - β - methoxyethylrhodanine used in the above example was prepared as follows:

A mixture of 27.2 g. (1 mol.) of 2 - β - acetanilidovinyl - β - naphthothiazole etho-p-toluenesulfonate, 9.6 g. (1 mol.) of 3-β-methoxyethylrhodanine and 5.0 g. (1 mol.) of triethylamine in 100 ml. of pyridine was heated at the refluxing temperature for 2 hours. After chilling, the solid was collected on a filter and washed with methyl alcohol. The remaining residue was stirred with

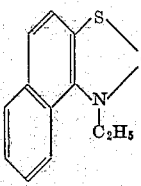
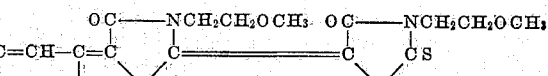

500 ml. of hot methyl alcohol and the suspension was filtered hot. After another such treatment with hot methyl alcohol the yield of dye was 61% and the green crystals had melting point 239–241° C. with decomposition.

*Example 23.—5 - [(3 - β - hydroxyethyl - 2(3) - α - naphthothiazolylidene)ethylidene] - 3 - β - methoxyethyl - 2 - (3 - β - methoxyethyl - 4 - oxo - 2 - thiono - 5 - thiazolylidene) - 4 - thiazolidone*

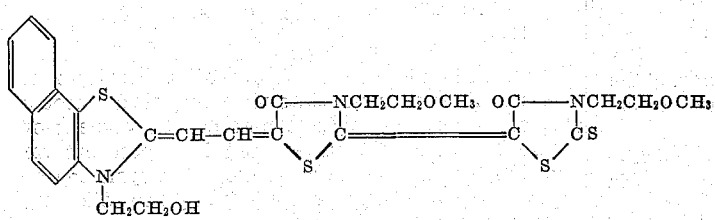

A mixture of 1.11 g. (1 mol.) of 5-[(3-β-hydroxyethyl - 2(3) - α - naphthothiazolylidene)ethylidene]-3-β-methoxyethylrhodanine and 0.93 g. (1 mol. plus 100% excess) of methyl p-toluenesulfonate was heated together at the temperature of the steam bath for 6 hours. The crude addition product, 0.46 g. (1 mol.) of 3-β-methoxyethylrhodanine, and 0.25 g. (1 mol.) of triethylamine in 25 ml. of dry pyridine were heated together at the refluxing temperature for 5 minutes. The cool reaction mixture was stirred with some methyl alcohol and the whole was chilled. The solid was collected on a filter and washed with methyl alcohol. The residue was stirred with 300 ml. of boiling methyl alcohol and the suspension was filtered hot. After another such treatment, the dye was dissolved in boiling pyridine and precipitated by adding methyl alcohol to the filtered pyridine solution. The yield of dye after another such purification was 33%. The dark green crystals had melting point 299–301° C. with decomposition.

The 5 - [(3 - β - hydroxyethyl - 2(3) - α - naphthothiazolylidene)ethylidene] - 3 - β - methoxyethylrhodanine used in the above example was prepared as follows:

A mixture of 4.27 g. (1 mol.) of 2-β-anilinovinyl - α - naphthothiazole - β - hydroxyethobromide, 1.91 g. (1 mol.) of 3-β-methoxyethylrhodanine and 1.01 g. (1 mol.) of triethylamine in 250 ml. of absolute ethyl alcohol was heated at the refluxing temperature for 50 minutes. After chilling, the solids were collected on the filter and washed with methyl alcohol. The residue was transferred to a beaker, stirred with hot methyl alcohol and the suspension was filtered hot. The yield of reddish crystals after one recrystallization was 25%.

*Example 24.—5 - [(1 - ethyl - 2(1) - β - naphthothiazolylidene) - α - phenylethylidene] - 3 - β - methoxyethyl - 2 - (3 - β - methoxyethyl - 4 - oxo - 2 - thiono - 5 - thiazolidylidene) - 4 - thiazolidone*

A mixture of 1.68 g. (1 mol.) of 5-[(1-ethyl-2(1) - β - naphthothiazolylidene) - α - phenylethylidene] - 3 - β - methoxyethylrhodanine and 1.24 g. (1 mol. plus 100% excess) of methyl p-toluenesulfonate was fused over a free flame for a few minutes. The crude addition product thus formed, 0.64 g. (1 mol.) of 3-β-methoxyethylrhodanine and 0.36 g. (1 mol. plus 5% excess) of triethylamine in 15 ml. of dry pyridine were heated together at the refluxing temperature for 7 minutes. The cool reaction mixture was stirred with ether. After chilling, the dye was collected on a filter and washed with methyl alcohol. The dye was dissolved in boiling pyridine and precipitated by adding methyl alcohol to the filtered pyridine solution. The yield of dye after another such purification was 52%. The dark green crystals had melting point 311° C. with decomposition.

The 5 - [(1 - ethyl - 2(1) - β - naphthothiazolylidene)-α-phenylethylidene] - 3 - β - methoxyethylrhodanine used in the above example was prepared as follows:

A mixture of 10.41 g. (1 mol.) of 1-ethyl-2-thiobenzoyl-methylene-β-naphthothiazoline and 5.58 g. (1 mol.) of methyl p-toluenesulfonate was heated over a free flame. The crude addition product, 5.73 g. (1 mol.) of 3-β-methoxyethylrhodanine and 3.18 g. (1 mol. plus 5% excess) of triethylamine in 100 ml. of absolute ethyl alcohol were heated together at the refluxing temperature for 40 minutes. After chilling, the reaction mixture was stirred with ether, the suspension was filtered and the residue was washed with ether. The crude dye was dissolved in hot pyridine and precipitated from the pyridine filtrate by the addition of ethyl alcohol. After two further purifications the yield of dye was 22%. The green crystals had melting point 242–243° C. with decomposition.

*Example 25.—3-ethyl-5-[(3-ethyl-2(3)-benzo-thiazolylidene)-α-ethylethylidene]-2-(3-β-hydroxy-β-ethoxy-β-ethoxyethyl-4-oxo-2-thiono-5-thiazolidylidene)-4-thiazolidone*

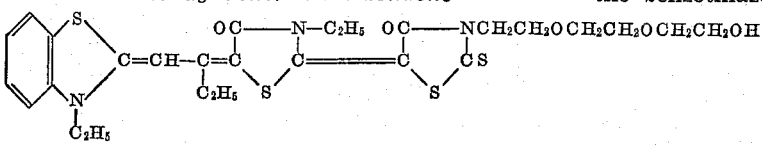

A mixture of 1.9 g. (1 mol.) of 3-ethyl-5-[(3-ethyl-2(3)-benzothiazolylidene)-α-ethylethylidene]rhodanine and 1.9 g. (1 mol. plus 100% excess) of methyl p-toluenesulfonate were heated together for one hour in an oil bath at 140–150° C. The cake of crystals was crushed under acetone and the suspension was filtered. The crude addition product, thus obtained, 1.33 g. (1 mol.) of crude 3-(β-hydroxy-β-ethoxy-β-ethoxyethyl)rhodanine and 0.5 g. (1 mol.) of triethylamine in 25 ml. of absolute ethyl alcohol were heated together at the refluxing temperature for 10 minutes. After chilling, the dye was washed on the filter with methyl alcohol. The yield of dye was 60% crude and 7% after two recrystallizations from acetone. The dark green crystals had melting point 180–183° C. with decomposition.

The 3-(β-hydroxy-β-ethoxy-β-ethoxyethyl)-rhodanine used in the above example was prepared in the same manner as the 3-β-methoxyethylrhodanine of Example 21 above, except that β-hydroxy-β-ethoxy-β-ethoxyethylamine was used instead of β-methoxyethylamine. Although the oily layer of the 3-(β-hydroxy-β-ethoxy-β-ethoxyethyl)rhodanine was insoluble in benzene, a mixture of the two was heated on the steam bath, under reduced pressure, first to dry the oily layer and then to remove the benzene. The residue of 8.8 g. of pale yellow oil was used without further purification.

The 3-ethyl-5-[(3-ethyl-2(3)-benzothiazolylidene)-α-ethylethylidene]rhodanine used in Example 25 was prepared as follows:

A mixture of 44.4 g. (1 mol.) of 3-ethyl-2-thiopropionylmethylenebenzothiazoline and 66.0 g. (1 mol. plus 100% excess) of methyl p-toluenesulfonate was heated at the temperature of the steam bath for 2 hours. The crude reaction mixture was washed with absolute ether. The addition product, 28.8 g. (1 mol.) of 3-ethylrhodanine and 17.9 g. (1 mol.) of triethylamine in 400 ml. of absolute ethyl alcohol were heated together at the refluxing temperature for 30 minutes. After chilling, the dye was collected on a filter and washed with methyl alcohol. A second portion of dye was isolated from the filtrate by treating it with water. The yield of dye, thus obtained, was 35%.

The above examples are merely representative of the methods which can be used to prepare the complex merocyanine dyes useful in practicing my invention, it being understood that other dyes represented by Formula II can be prepared in like manner.

What I claim as my invention and desire secured by Letters Patent of the United States is:

1. A photographic silver halide emulsion sensitized with a supersensitizing combination of at least one diaryloxythiacarbocyanine dye selected from those represented by the following general formula:

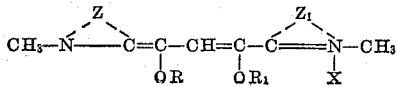

wherein R and $R_1$ each represents an aryl group, Z and $Z_1$ each represents the nonmetallic atoms necessary to complete a heterocyclic nucleus of the benzothiazole series, and X represents an anion, and at least one complex merocyanine dye selected from those represented by the following general formula:

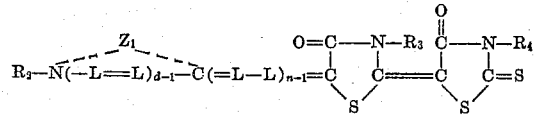

wherein $R_2$, $R_3$, and $R_4$ each represents an alkyl group, L represents a methine group, $d$ and $n$ each represents a positive integer of from 1 to 2, and $Z_2$ represents the nonmetallic atoms necessary to complete a heterocyclic nucleus selected from the group consisting of those of the benzothiazole series, those of the α-naphthothiazole series, those of the β-naphthothiazole series, those of the benzoxazole series, and those of the quinoline series.

2. A photographic gelatino-silver halide developing-out emulsion sensitized with a supersensitizing combination of at least one diaryloxythiacarbocyanine dye selected from those represented by the following general formula:

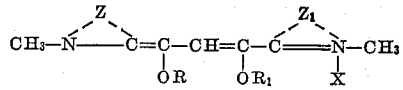

wherein R and $R_1$ each represents an aryl group, Z and $Z_1$ each represents the nonmetallic atoms necessary to complete a heterocyclic nucleus of the benzothiazole series, and X represents an anion, and at least one complex merocyanine dye selected from those represented by the following general formula:

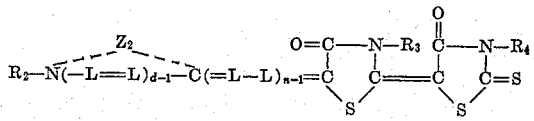

wherein $R_2$, $R_3$, and $R_4$ each represents an alkyl group, L represents a methine group, $d$ and $n$ each represents a positive integer of from 1 to 2, and $Z_2$ represents the nonmetallic atoms necessary to complete a heterocyclic nucleus selected from the group consisting of those of the benzothiazole series, those of the α-naphthothiazole series, those of the β-naphthothiazole series, those of the benzoxazole series, and those of the quinoline series.

3. A photographic gelatino-silver-bromiodide developing-out emulsion sensitized with a supersensitizing combination of at least one diaryloxythiacarbocyanine dye selected from those represented by the following general formula:

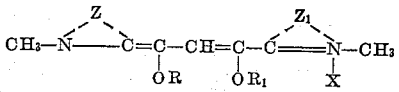

wherein R and $R_1$ each represents an aryl group, Z and $Z_1$ each represents the nonmetallic atoms necessary to complete a heterocyclic nucleus of the benzothiazole series, and X represents an anion, and at least one complex merocyanine dye selected from those represented by the following general formula:

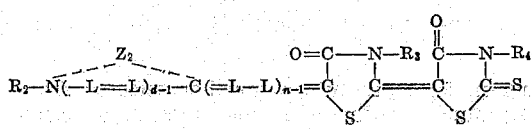

wherein $R_2$, $R_3$, and $R_4$ each represents an alkyl group, L represents a methine group, $d$ and $n$ each represents a positive integer of from 1 to 2, and $Z_2$ represents the nonmetallic atoms necessary to complete a heterocyclic nucleus selected from the group consisting of those of the benzothiazole series, those of the α-naphthothiazole series, those of the β-naphthothiazole series, and those of the benzoxazole series, and those of the quinoline series.

4. A photographic silver halide developing-out emulsion sensitized with a supersensitizing combination of at least one diaryloxythiacarbocyanine dye selected from those represented by the following general formula:

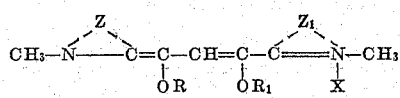

wherein R and $R_1$ each represents a mononuclear aromatic group of the benzene series, Z and $Z_1$ each represents the nonmetallic atoms necessary to complete a heterocyclic nucleus of the benzothiazole series, and X represents an anion, and at least one complex merocyanine dye selected from those represented by the following general formula:

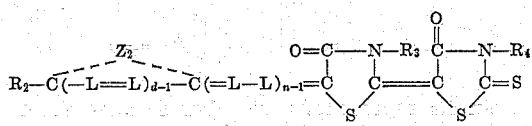

wherein $R_2$ represents a member selected from the group consisting of a methyl group, an ethyl group, and a β-hydroxyethyl group, $R_3$ and $R_4$ each represents a member selected from the group consisting of a methyl group, an ethyl group, a n-heptyl group, a β-methoxyethyl group, a carbethoxymethyl group, and a β-hydroxy-β-ethoxy-β-ethoxy-ethyl group, L represents a methine group, $d$ and $n$ each represents a positive integer of from 1 to 2, and $Z_2$ represents the nonmetallic atoms necessary to complete a heterocyclic nucleus selected from the group consisting of those of the benzothiazole series, those of the α-naphthothiazole series, those of the β-naphthothiazole series, those of the benzoxazole series, and those of the quinoline series.

5. A photographic silver halide developing-out emulsion sensitized with a supersensitizing combination of at least one diaryloxythiacarbocyanine dye selected from those represented by the following general formula:

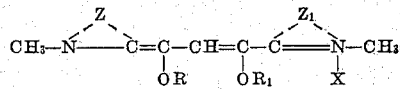

wherein R and $R_1$ each represents a mononuclear aromatic group of the benzene series, Z and $Z_1$ each represents the nonmetallic atoms necessary to complete a heterocyclic nucleus of the benzothiazole series, and X represents an anion, and at least one complex merocyanine dye selected from those represented by the following general formula:

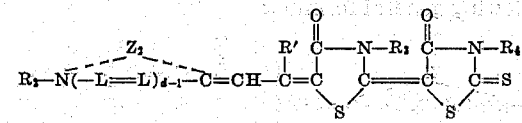

wherein $R_2$ represents a member selected from the group consisting of a methyl group, an ethyl group, and a β-hydroxyethyl group, $R_3$ and $R_4$ each represents a member selected from the group consisting of a methyl group, an ethyl group, a n-heptyl group, a β-methoxyethyl group, a carbethoxymethyl group, and a β-hydroxy-β-ethoxy-β-ethoxyethyl group, R' represents a member selected from the group consisting of a methyl group, an ethyl group, and a phenyl group, L represents a methine group, $d$ represents a positive integer of from 1 to 2, and $Z_2$ represents the nonmetallic atoms necessary to complete a heterocyclic nucleus selected from the group consisting of those of the benzothiazole series, those of the α-naphthothiazole series, those of the β-naphthothiazole series, those of the benzoxadole series, and those of the quinoline series.

6. A photographic silver halide developing-out emulsion sensitized with a supersensitizing combination of at least one diaryloxythiacarbocyanine dye selected from those represented by the following general formula:

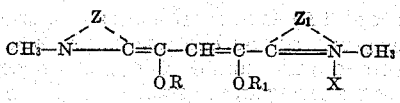

wherein R and $R_1$ each represents a mononuclear aromatic group of the benzene series, Z and $Z_1$ each represents the nonmetallic atoms necessary to complete a heterocyclic nucleus of the benzothiazole series, and at least one complex merocyanine dye selected from those represented by the following general formula:

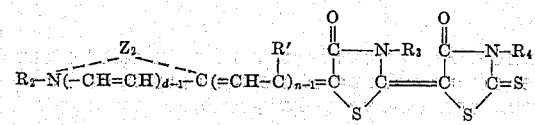

wherein $R_2$ represents a member selected from the group consisting of a methyl group, an ethyl group, and a β-hydroxyethyl group, $R_3$ and $R_4$ each represents a member selected from the group consisting of a methyl group, an ethyl group, a n-heptyl group, a β-methoxyethyl group, a carbethoxymethyl group, and a β-hydroxy-β-ethoxy-β-ethoxyethyl group, R' represents a member selected from the group consisting of a hydrogen atom, a methyl group, an ethyl group, and a phenyl group, $d$ and $n$ each represents a positive integer of from 1 to 2, and $Z_2$ represents the nonmetallic atoms necessary to complete a heterocyclic nucleus of the α-naphthothiazole series.

7. A photographic silver halide developing-out emulsion sensitized with a supersensitizing combination of at least one diaryloxythiacarbocyanine dye selected from those represented by the following general formula:

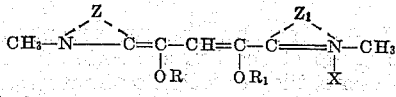

wherein R and $R_1$ each represents a mononuclear aromatic group of the benzene series, Z and $Z_1$ each represents the nonmetallic atoms necessary to complete a heterocyclic nucleus of the benzothiazole series, and at least one complex merocyanine dye selected from those represented by the following general formula:

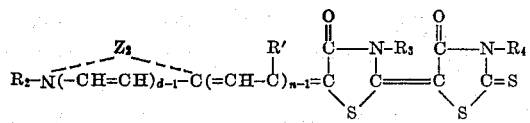

wherein $R_2$, represents a member selected from the group consisting of a methyl group, an ethyl group, and a β-hydroethyl group, $R_3$ and $R_4$ each represents a member selected from the group consisting of a methyl group, an ethyl group, a n-heptyl group, a β-methoxyethyl group, a carbethoxymethyl group, and a β-hydroxy-β-ethoxy-β-ethoxyethyl group, R' represents a member selected from the group consisting of a hydrogen atom, a methyl group, an ethyl group, and a phenyl group, $d$ and $n$ each represents a positive integer of from 1 to 2, and $Z_2$ represents the nonmetallic atoms necessary to complete a heterocyclic nucleus of the β-naphthothiazole series.

8. A photographic silver halide developing-out emulsion sensitized with a supersensitizing combination of at least one diaryloxythiacarbocyanine dye selected from those represented by the following general formula:

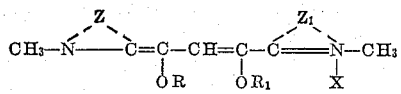

wherein R and $R_1$ each represents a mononuclear aromatic group of the benzene series, Z and $Z_1$ each represents the nonmetallic atoms necessary to complete a heterocyclic nucleus of the benzothiazole series, and at least one complex merocyanine dye selected from those represented by the following general formula:

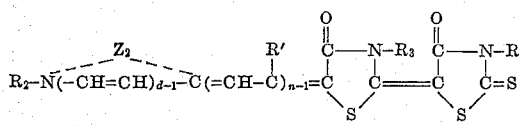

wherein $R_2$ represents a member selected from the group consisting of a methyl group, an ethyl group, and a β-hydroethyl group, $R_3$ and $R_4$ each represents a member selected from the group consisting of a methyl group, an ethyl group, a n-heptyl group, a β-methoxyethyl group, a carbethoxymethyl group, and a β-hydroxy-β-ethoxy-β-ethoxyethyl group, R' represents a member selected from the group consisting of a hydrogen atom, a methyl group, an ethyl group, and a phenyl group, $d$ and $n$ each represents a positive integer of from 1 to 2, and $Z_2$ represents the nonmetallic atoms necessary to complete a heterocyclic nucleus of the benzoxazole series.

9. A photographic silver halide developing-out emulsion sensitized with a supersensitizing combination of at least one diaryloxythiacarbocyanine dye selected from those represented by the following general formula:

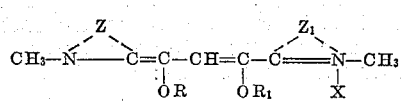

wherein R and $R_1$ each represents a mononuclear aromatic group of the benzene series, Z and $Z_1$ each represents the nonmetallic atoms necessary to complete a heterocyclic nucleus of the benzothiazole series, and at least one complex merocyanine dye selected from those represented by the following general formula:

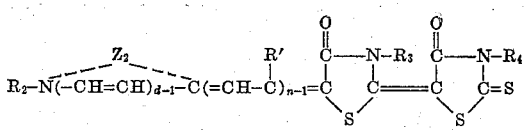

wherein $R_2$ represents a member selected from the group consisting of a methyl group, an ethyl group, and a β-hydroethyl group, $R_3$ and $R_4$ each represents a member selected from the group consisting of a methyl group, an ethyl group, an n-heptyl group, a β-methoxyethyl group, a carbethoxymethyl group, and a β-hydroxy-β-ethoxy-β-ethoxyethyl group, R' represents a member selected from the group consisting of a hydrogen atom, a methyl group, an ethyl group, and a phenyl group, $d$ and $n$ each represents a positive integer of from 1 to 2, and $Z_2$ represents the nonmetallic atoms necessary to complete a heterocyclic nucleus of the quinoline series.

10. A photographic silver halide developing-out emulsion sensitized with a supersensitizing combination of at least one diaryloxythiacarbocyanine dye selected from these represented by the following general formula:

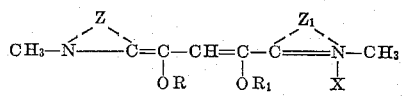

wherein R and $R_1$ each represents a mononuclear aromatic group of the benzene series, Z and $Z_1$ each represents the nonmetallic atoms necessary to complete a heterocyclic nucleus of the benzothiazole series, and at least one complex merocyanine dye selected from those represented by the following general formula:

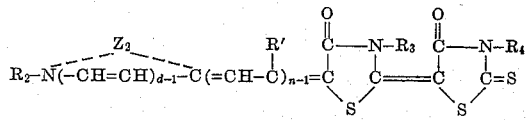

wherein $R_2$ represents a member selected from the group consisting of a methyl group, an ethyl group, and a β-hydroethyl group, $R_3$ and $R_4$ each represents a member selected from the group consisting of a methyl group, an ethyl group, an n-heptyl group, a β-methoxyethyl group, a carbethoxymethyl group, and a β-hydroxy-β-ethoxy-β-ethoxyethyl group, R' represents a member selected from the group consisting of a hydrogen atom, a methyl group, an ethyl group, and a phenyl group, $d$ and $n$ each represents a positive integer of from 1 to 2, and $Z_2$ represents the nonmetallic atoms necessary to complete a heterocyclic nucleus of the benzothiazole series.

11. A photographic gelatino-silver-halide developing-out emulsion sensitized with a supersensitizing combination of 8,10-di (p-chlorophenoxy)- 3,3'- dimethylthiacarbocyanine p-toluenesulfonate and 5-[(1-ethyl-2(1)-β-naphthothiazolylidene] -α- ethylethylidene] -3-β-methoxyethyl-2-(3-β-methoxyethyl -4- oxo-2-thiono-5-thiazo-lidylidene)-4-thiazolidone.

12. A photographic gelatino-silver-halide developing-out emulsion sensitized with a supersensitizing combination of 3,3'-dimethyl-8,10-di(m-toloxy)thiacarbocyanine bromide and 5-[(3-β-hydroxyethyl -2(3) -α- naphthothiazolylidene) ethylidene]-3-β- methoxyethyl -2-(3-β-methoxyethyl-4-oxo -2- thiono -5- thiazolidylidene)-4-thiazolidone.

13. A photographic gelatino-silver-halide developing-out emulsion sensitized with a supersensitizing combination of 3,3'-dimethyl-8,10-di(m-toloxy)thiacarbocyanine bromide and 2-

(3-carbethoxymethyl-4-oxo-2-thiono-5-thiazolidylidene)-3-ethyl-5-[(1-ethyl-2(1)-β-naphthothiazolylidene)isopropylidene]-4-thiazolidone.

14. A photographic gelatino-silver-halide developing-out emulsion sensitized with a supersensitizing combination of 8,10-di(p-methoxyphenoxy)-3,3'-dimethylthiacarbocyanine bromide and 5-[(1-ethyl-2(1)-β-naphthothiazolylidene)2-ethylethylidene]-3-β-methoxyethyl-2-(3-β-methoxyethyl-4-oxo-2-thiono-5-thiazolidylidene)-4-thiazolidone.

15. A photographic gelatino-silver-halide developing-out emulsion sensitized with a supersensitizing combination of 3,3'-dimethyl-8,10-diphenoxythiacarbocyanine bromide and 5-[(1-ethyl-2(1)-β-naphthothiazolylidene)-α-ethylethylidene]-3-β-methoxy-ethyl-2-(3-β-methoxyethyl-4-oxo-2-thiono-5-thiazolidylidene)-4-thiazolidone.

BURT H. CARROLL.

No references cited.